(12) United States Patent
Wyman

(10) Patent No.: US 7,574,567 B2
(45) Date of Patent: *Aug. 11, 2009

(54) MONITORING PROCESSES IN A NON-UNIFORM MEMORY ACCESS (NUMA) COMPUTER SYSTEM

(75) Inventor: Blair Wyman, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/106,275

(22) Filed: Apr. 19, 2008

(65) Prior Publication Data

US 2008/0229308 A1 Sep. 18, 2008

Related U.S. Application Data

(63) Continuation of application No. 11/128,070, filed on May 12, 2005, now Pat. No. 7,383,396.

(51) Int. Cl.
*G06F 12/00* (2006.01)

(52) U.S. Cl. .................. 711/141; 711/148; 711/156; 711/167; 717/127; 718/102; 718/103

(58) Field of Classification Search .......... 711/141, 711/148, 156, 167; 717/127; 718/102, 103
See application file for complete search history.

(56) References Cited

U.S. PATENT DOCUMENTS

| | | | |
|---|---|---|---|
| 6,105,053 A | 8/2000 | Kimmel et al. | |
| 6,195,676 B1 | 2/2001 | Spix et al. | |
| 6,256,775 B1 | 7/2001 | Flynn | |
| 6,269,390 B1 | 7/2001 | Boland | |
| 6,289,369 B1 | 9/2001 | Sundaresan | |
| 6,349,394 B1 | 2/2002 | Brock et al. | |
| 7,146,607 B2 | 12/2006 | Nair et al. | |

OTHER PUBLICATIONS

Mu et al., "Interactive Locality Optimization on NUMA Architectures", pp. 1-9, ACM, Jun. 13, 2003.*
Tao et al., "Visualizing the Memory Access Behavior of Shared Memory Applications on NUMA Architectures", Proceedings of the 2001 International Conference on Computational Science (ICCS), vol. 2074 of LNCS, p. 861-870, 2001.*

* cited by examiner

*Primary Examiner*—Stephen C Elmore
(74) *Attorney, Agent, or Firm*—Roy W. Truelson

(57) ABSTRACT

A monitoring process for a NUMA system collects data from multiple monitored threads executing in different nodes of the system. The monitoring process executes on different processors in different nodes. The monitoring process intelligently collects data from monitored threads according to the node it which it is executing to reduce the proportion of inter-node data accesses. Preferably, the monitoring process has the capability to specify a node to which it should be dispatched next to the dispatcher, and traverses the nodes while collecting data from threads associated with the node in which the monitor is currently executing. By intelligently associating the data collection with the node of the monitoring process, the frequency of inter-node data accesses for purposes of collecting data by the monitoring process is reduced, increasing execution efficiency.

13 Claims, 6 Drawing Sheets

MONITORING PROCESSES IN A NON-UNIFORM MEMORY ACCESS (NUMA) COMPUTER SYSTEM

CROSS REFERENCE TO RELATED APPLICATION

This is a continuation of pending U.S. patent application Ser. No. 11/128,070, filed May 12, 2005, entitled "Method and Apparatus for Monitoring Processes in a Non-Uniform Memory Access (NUMA) Computer System", which is herein incorporated by reference. This application claims priority under 35 U.S.C. §120 of U.S. patent application Ser. No. 11/128,070, filed May 12, 2005.

FIELD OF THE INVENTION

The present invention relates to digital data processing, and in particular to the operation of process monitoring software in computer systems having multiple central processing units and non-uniform memory access.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but doing it much faster, and thereby enabling the use of software having enhanced function. Therefore continuing improvements to computer systems require that these systems be made ever faster.

The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). E.g., if everything runs twice as fast but otherwise works in exactly the same manner, the system will perform a given task in half the time. Enormous improvements in clock speed have been made possible by reduction in component size and integrated circuitry, to the point where an entire processor, and in some cases multiple processors along with auxiliary structures such as cache memories, can be implemented on a single integrated circuit chip. Despite these improvements in speed, the demand for ever faster computer systems has continued, a demand which can not be met solely by further reduction in component size and consequent increases in clock speed. Attention has therefore been directed to other approaches for further improvements in throughput of the computer system.

Without changing the clock speed, it is possible to improve system throughput by using multiple processors. The modest cost of individual processors packaged on integrated circuit chips has made this approach practical. However, one does not simply double a system's throughput by going from one processor to two. The introduction of multiple processors to a system creates numerous architectural problems. For example, the multiple processors will typically share the same main memory (although each processor may have its own cache). It is therefore necessary to devise mechanisms that avoid memory access conflicts, and assure that extra copies of data in caches are tracked in a coherent fashion. Furthermore, each processor puts additional demands on the other components of the system such as storage, I/O, memory, and particularly, the communications buses that connect various components. As more processors are introduced, these architectural issues become increasingly complex, scalability becomes more difficult, and there is greater likelihood that processors will spend significant time waiting for some resource being used by another processor.

All of these issues and more are known by system designers, and have been addressed in one form or another. While perfect solutions are not available, improvements in this field continue to be made.

One architectural approach that has gained some favor in recent years is the design of computer systems having discrete nodes of processors and associated local portions of addressable main memory, also known as distributed shared memory computer systems or non-uniform memory access (NUMA) computer systems. In a conventional symmetrical multi-processor (SMP) system, addressable main memory is designed as a single large data storage entity, which is equally accessible to all CPUs in the system. As the number of CPUs increases, there are greater bottlenecks in the buses and accessing mechanisms to such main memory. A NUMA system confronts this problem by dividing addressable main memory into subsets of discrete address ranges, each of which is physically associated with a respective CPU, or more typically, a respective group of CPUs. A subset of memory and associated CPUs and associated local hardware is sometimes called a "node". A node typically has an internal memory bus providing direct access from a CPU to the memory subset ("local memory") within the node. Indirect mechanisms, which are slower, exist to access portions of main memory located across node boundaries. Thus, while any CPU can still access any arbitrary addressable memory location, a CPU can access addresses in its own node faster than it can access addresses outside its node (hence, the term "non-uniform memory access"). By limiting the number of devices on the internal memory bus of a node, bus arbitration mechanisms and bus traffic can be held to manageable levels even in a system having a large number of CPUs, since most of these CPUs will be in different nodes. From a hardware standpoint, this means that a NUMA system architecture has the potential advantage of increased scalability.

A NUMA system provides inter-node access so that it has a single logical main memory, each location having a unique address. But inter-node access is relatively slow and burdensome of certain system resources. In order for a NUMA system to work efficiently, the data required by a task executing on a CPU should generally be stored in the local memory of the same node as the CPU.

It is impractical to guarantee that this will always be the case, but NUMA systems generally have mechanisms which make it likely that data required by a CPU will be stored in the local memory. For example, dispatching mechanisms which always or preferentially dispatch tasks to consistent nodes for execution, and paging mechanisms which always or preferentially load memory pages from storage to the local node which caused the page fault, will tend achieve this result. It can therefore be assumed that in a typical NUMA system environment, most of the data required by a thread executing on a processor will be available in the local node of the processor.

Many complex computer systems use some form of monitoring software for monitoring the performance of the system. Monitoring may take the form of executing one or more monitoring thread which collects data, while the computer system executes other threads on behalf of user applications to perform useful work; this collected data is sometimes analyzed in real time, i.e., during the collection, but often analyzed subsequently. Some monitoring threads may be used to monitor individual threads executing on behalf of user applications ("monitored threads"). Such monitoring threads may need to access state data of the monitored threads to collect the necessary data.

If a monitoring thread needs to collect state data from multiple monitored threads in a NUMA system, the monitored threads may be executing on different processors in different nodes (or be in wait states, having recently executed on different processors in different nodes). In this case, it is likely that the state data needed for data collection by the monitoring thread will reside in different local memories of different nodes. It is therefore likely that the monitoring thread will perform a substantial number of inter-node data accesses to collect the required data. A substantially even or random distribution of monitored threads, which may be common in the case of some monitoring threads, makes monitoring data collection very inefficient in a typical NUMA system.

As programs grow in size and complexity, and NUMA systems also become larger, the task of collecting and analyzing performance data increases in difficulty. A need exists for improved techniques for collecting data from monitored programs, and in particular from programs being executed on computer systems employing a NUMA design.

SUMMARY OF THE INVENTION

A monitoring process for a NUMA system collects data from multiple monitored threads executing in different parts of the system, which are preferably nodes, each node having at least one processor and a respective portion of memory. The monitoring process executes on different processors in different parts of the system (which are also preferably nodes). The monitoring process intelligently collects data from monitored threads according to the node it which it is executing to reduce the proportion of inter-node data accesses.

In the preferred embodiment, the monitoring process has the capability to specify a node to which it should be dispatched next to the dispatcher. The monitoring process accesses data from each monitored thread in sequence, and performs an intelligent ordering of the sequence in which monitored threads are handled. This intelligent ordering tends to group threads associated with a particular node together, so that the monitoring process will tend to access groups of threads, each associated with a particular node. When accessing such a group, the monitoring process causes the dispatcher to dispatch it to the node with which the group is associated. Data accesses for collecting data from the monitored threads are therefore primarily within the local node on which the monitoring thread is currently executing.

In a first implementation of the preferred embodiment, the monitoring process traverses a list of monitored threads and collects data from any thread which is currently executing, or which most recently executed, on the node of the monitoring process. When no more threads remain on the list, the monitoring process causes the dispatcher to dispatch it to another node, and again traverses the list of monitored threads. The monitoring process causes itself to be dispatched to each node in sequence. At the last node, it may be necessary to perform a special procedure to collect data from any threads which were missed.

In a second implementation of the preferred embodiment, the monitoring process pre-sorts a list of monitored threads according to the nodes with which the monitored threads are associated, and traverses the list in the pre-sorted order. When a group of threads associated with a particular node is completed, the monitoring process causes itself to be dispatched to the next node in sequence.

In a third implementation of the preferred embodiment, the monitoring process collects data in an arbitrary order, and if necessary causes itself to be dispatched to the node with which the next thread is associated before collecting data from that thread.

By intelligently associating the data collection with the node of the monitoring process as described herein, the frequency of inter-node data accesses for purposes of collecting data by the monitoring process is substantially reduced, increasing the efficiency of execution of the monitoring process and reducing the performance burden on the system.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Overview

The present invention relates to monitoring software in a multiprocessor, non-uniform memory access (NUMA) computer system environment. As described herein, a monitoring process for a NUMA computer system collects data associated with multiple concurrently executing threads being monitored by causing itself to be relocated among multiple nodes and examining the data associated with different threads in a sequence which takes nodal affinity of the threads into account, so that most of the data accesses needed for data collection by the monitoring process occur within the local node in which the thread is executing at the time of the data access. In general, monitored threads are threads executing on behalf of user applications to perform useful work for some user, although threads being monitored could conceivably be other threads. A monitoring process may collect data from multiple monitored threads for any of various purposes. For example, such data may be used to analyze the performance of a computer system and re-adjust operating parameters to "tune" performance; to signal overloaded or other operating conditions which might require corrective action; to analyze and predict the need for additional system resources to handle operating loads; to record usage for billing or other purposes; to understand behavior of one or more monitored programs for purposes of efficient computer program development; and so forth. The present invention relates only to the efficient collection of monitoring data, without any limitation on the use to which such data may be put. For consistency, the term "thread" is used herein to describe an instance of a sequence of computer executable instructions having its own state, which is the entity dispatched by a dispatcher. In some environments, these are referred to as "tasks", and no distinction is made herein between "threads" and "tasks". The term "thread" is used by some to imply that a process spawns multiple concurrently executable threads from a single program; however, as used herein, no such limitation should be implied, and a process may generate only a single thread of execution, or may generate multiple threads. The preferred embodiment as described herein, the monitoring process is itself executed as a single "thread", i.e. a "monitoring thread"; however, a monitoring process or task, being an executable instance of a monitoring program or function, could alternatively be implemented as multiple "threads" of execution.

NUMA System Hardware

Figure 1:
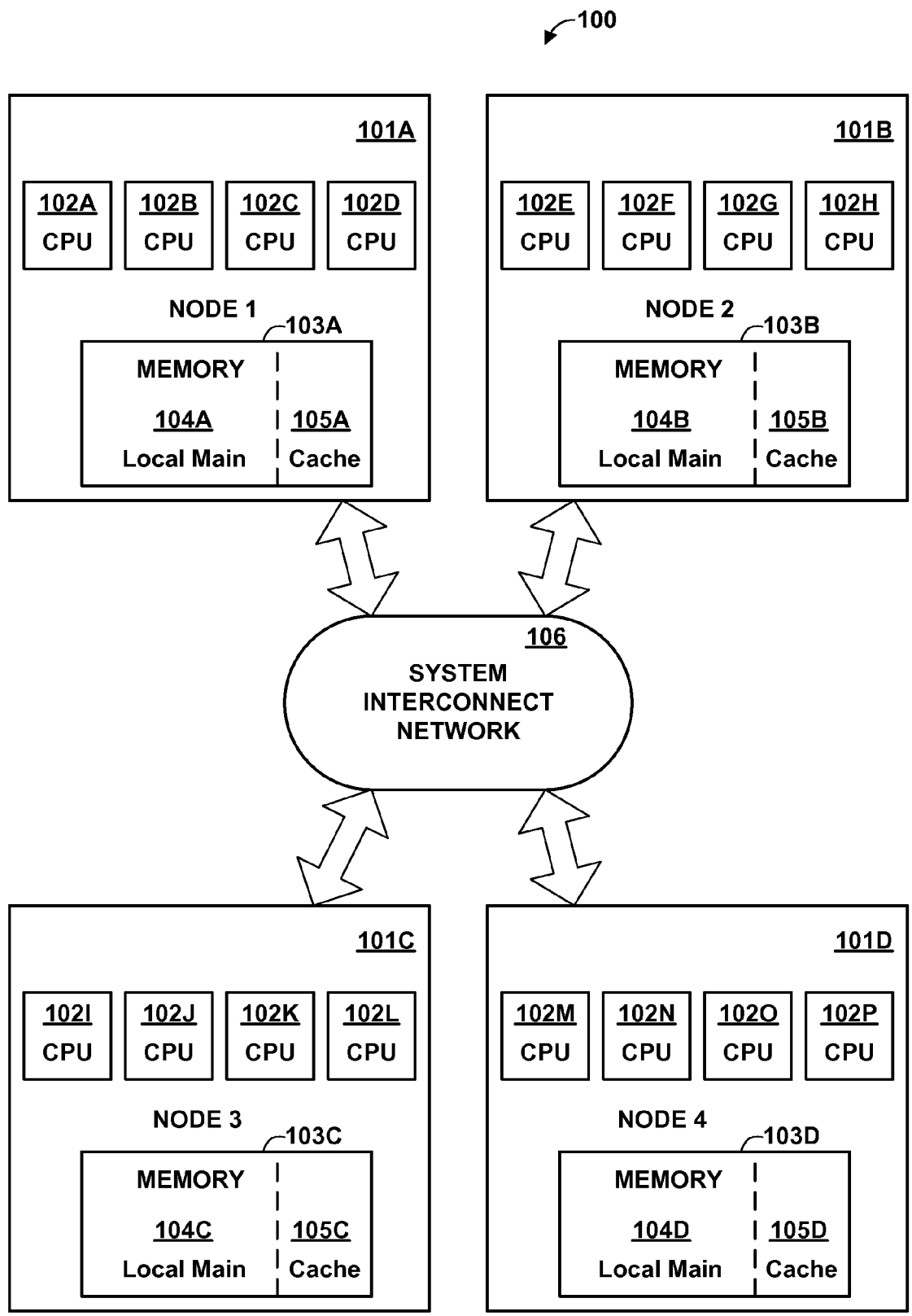
FIG. 1 is a high-level block diagram of the major components of a multi-node, multiprocessor NUMA computer system, in accordance with the preferred embodiment of the present invention.

Referring to the Drawing, wherein like numbers denote like parts throughout the several views, FIG. 1 is a high-level block diagram of the major hardware components of a multi-node, multiprocessor computer system 100 in accordance with the preferred embodiment of the present invention. Computer system 100 is designed according to a NUMA architecture, also referred to as a Distributed Shared Memory (DSM) architecture. Computer system 100 comprises multiple nodes 101A-101D (herein generically referred to as feature 101), of which four are shown in the exemplary system of FIG. 1, it being understood that the number of nodes may vary. Each node includes multiple general-purpose programmable central processing units (CPUs) 102A-102P (herein generically referred to as feature 102) and a local memory 103A-103D (herein generically referred to as feature 103). Each local memory 103 is allocated between a local main memory portion 104A-104D (herein referred to generically as feature 104) and a remote memory cache 105A-105D (herein referred to generically as feature 105).

Computer system 100 utilizes a distributed main memory, comprising a separate local main memory portion 104A-104D in each respective node 101A-101D. Collectively, local main memory portions 104A-104D constitute the main memory of computer system 100. The main memory is addressable using a single common real address space, which is shared by all CPUs throughout the system. A respective portion of the real address space is allocated to each local memory portion 104A-104D in a persistent, fixed manner. I.e., the address space allocation does not change with each thread, process, user, or similar parameter, although it may be possible to change the allocation by reconfiguring the system. Thus, the real address space of main memory is constant across the entire system, and any memory location in a local memory 104 has a unique real address which is the same for all processors and all nodes.

The nodes are connected to one another by an inter-node communications network 106 that permits any node to communicate with any other node. The purpose of inter-node communications network is to allow devices to communicate across node boundaries, and in particular, to allow a processor in any node to access the memory resident in any other node. Inter-node communications network 106 may employ any technique, now known or hereafter developed, for supporting communication among multiple nodes in a computer system. Ideally, the inter-node communications medium should provide high bandwidth and low latency, and be scalable to allow for the addition of more nodes. Network 106 may be arranged as a set of point-to-point interconnection links, as a ring topology, as a common multi-drop bus topology, or in some other manner. Connections may be wired or wireless (e.g, optical), depending on system performance needs. As just one example, network 106 may be a switch-based network that uses the Scalable Coherent Interface (SCI) interconnection mechanism conforming to the IEEE 1596-1992 or subsequent standard. SCI is a high-bandwidth interconnection network implemented by a pumped bus that sends packets on each individual point-to-point interconnect. Although various embodiments of system interconnect network 106 are possible, all share the characteristic that internode communication is inherently slower than communication within a node.

In the preferred embodiment, a portion of local memory 103 is allocated to a remote memory cache 105 for temporarily storing some of the data from local main memories in other nodes. Remote memory cache 105 improves memory access time because at least some memory access by a processor 102 to an address in a local main memory portion within another node will be satisfied from cache 105 in the processor's node. While the use of a cache may reduce the burden of accessing data in the local memory of a different node, it does not eliminate it entirely, and even with remote memory cache 105 accesses to memory locations in different nodes are, on average, significantly slower than accesses to memory locations in the same node. In an alternative embodiment, local memory 103 does not contain a cache.

Figure 2:
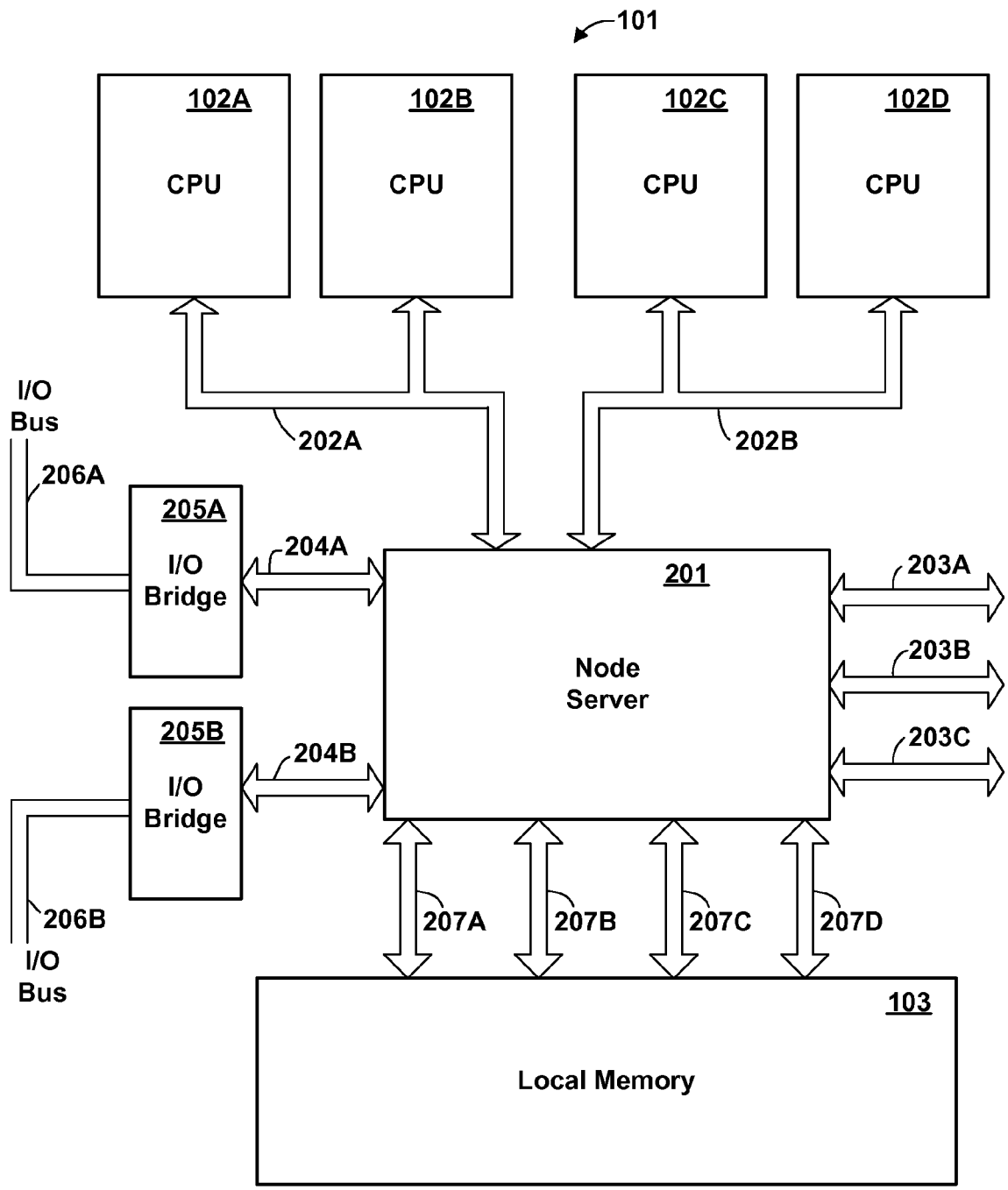
FIG. 2 is a high-level block diagram of the major hardware components of a typical node of a multi-node computer system, according to the preferred embodiment.

FIG. 2 is a block diagram of the major hardware components of a typical node 101 of computer system 100 in accordance with the preferred embodiment. Node 101 includes one or more central processing units (CPUs) 102 (of which four are shown in FIG. 2), a local portion of main memory 103, and a node server 201, which functions as a communications and memory control device. A node may optionally include one or more I/O bridge units 205A-205B (herein generically referred to as feature 205), of which two are shown in FIG. 2. A pair of local processor buses 202A, 202B (herein generically referred to as feature 202) connects the CPUs 102 with node server 201. Point-to-point inter-node communication links 203A-203C (herein generically referred to as feature 203), of which three are shown in FIG. 2, couple respective inter-node communication ports (referred to as scalability ports) in node server 201 with corresponding ports in other nodes. A pair of local I/O buses 204A, 204B (herein generically referred to as feature 204) connects I/O bridge units 205 with node server 201. A set of four local memory buses 207A-207D (herein referred to generically as feature 207) connect memory 103 with node server 201. Physically, node 101 is preferably implemented as multiple integrated circuit chips mounted on as single circuit card, having embedded printed circuit connections running among the various chips.

Each CPU 102 performs basic machine processing functions on instructions and other data from the distributed main memory. Each CPU preferably contains or controls a respective set of caches (not shown) for temporary storage of data and instructions, some of which may be shared among more than one CPU. For example, each CPU may contain a respective level 1 instruction cache (L1 I-cache) and a respective level 1 data cache (L1 D-cache) while a lower level cache such as an L2 or L3 cache might be shared by more than one CPU. In the preferred embodiment, a processor 102 and the caches it contains are constructed on a single semiconductor integrated circuit "chip", sometimes called a "processor chip". In some embodiments, a single chip may contain more than one processor.

Local processor buses 202 couple the CPUs 102 and their associated caches to node server 201. Although represented in FIG. 2 as simple multi-drop buses, local processor buses 202 may be constructed according to any of various architectures, now known or hereafter developed.

Each I/O bridge unit 205 provides an interface to a respective I/O bus 206A-206B (herein generically referred to as feature 206), and is coupled to node server via a local I/O bus 204. Each I/O bus 206 connects one or more I/O devices (not shown) to node 101. I/O devices may include any of various devices, such as direct access storage devices, tape drives, workstations, printers, and remote communications adapters for communications with remote devices or with other computer systems through dedicated communications lines or networks. The number and range of I/O devices may vary considerably, and may include devices hereafter developed. I/O bridge unit 205 provides an interface between two different buses 204 and 206, and provides buffering and other necessary functions for interfacing different buses which may be operating at different speeds, data widths, protocols, etc.

Node server 201 functions as a communications and memory control device. The node server provides a central point of control for data flowing into and out of node 101, and between certain functional units within node 101. In particular, node server 201 transmits memory access requests from local processors 102 to local memory 103 over a local memory bus 207 or remote nodes via an appropriate inter-node communication link 203, as the case may be.

Local memory 103 is coupled to node server 201 via local memory buses 207. Local memory 103, while represented as a single monolithic entity in FIGS. 1 and 2, is in fact generally constructed as multiple integrated circuit chips and other components. Local memory buses 207 collectively comprise a communications medium coupled to all such chips, and may be constructed according to any conventional technique or any technique hereafter developed.

Node server 201 of the preferred embodiment contains physical ports for supporting up to two processor buses 202, three inter-node communication links 203, two local I/O buses 204, and four local memory buses 207. However, it is not necessary that all such ports be utilized in any particular configuration, and some system configurations may use fewer than all available ports. Furthermore, a node server might have a different number of ports for processors, inter-node links, local I/O buses and/or local memory buses.

While a system having four nodes is shown in FIG. 1, and a typical node having four CPUs and various other devices is shown in FIG. 2, it should be understood that FIGS. 1 and 2 are intended only as a simplified example of one possible configuration of a system for illustrative purposes, that the number and types of possible devices in such a configuration may vary, and that the system often includes additional devices not shown. It should further be understood that it is not required that all nodes be identical, that all nodes have the same number of CPUs or the same amount of addressable local memory, or that all nodes have attached I/O buses and I/O devices. While various system components have been described and shown at a high level, it should be understood that a typical computer system contains many other components not shown, which are not essential to an understanding of the present invention.

System Software Overview

Figure 3:
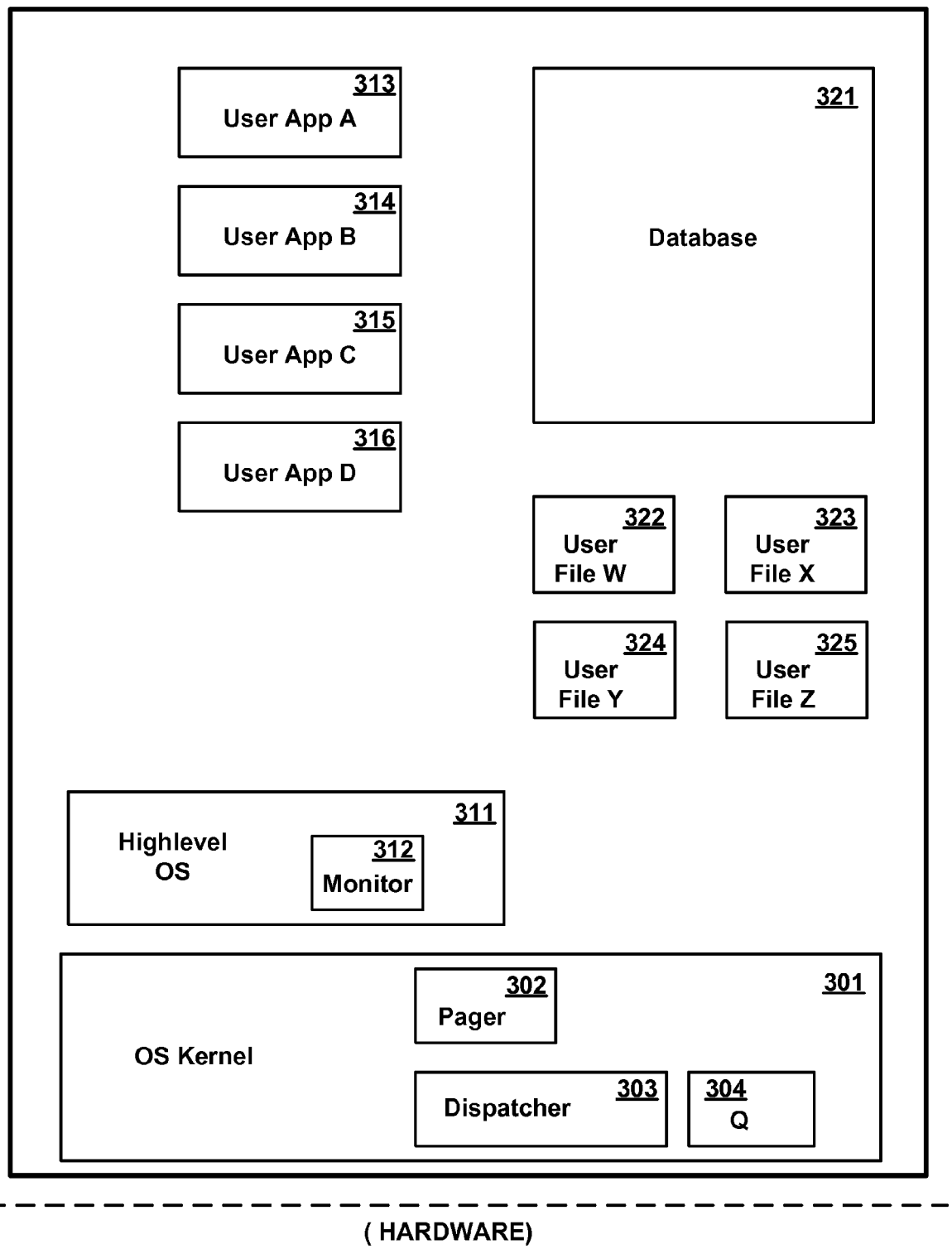
FIG. 3 is a conceptual illustration of the major software components of a NUMA computer system having a software monitor for monitoring the execution of multiple threads, according to the preferred embodiment.

FIG. 3 is a conceptual illustration showing the major software components of computer system 100. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through operating system code and ultimately to data bits which get put in machine registers to force certain actions. At a very low level, changing electrical potentials cause various transistors to turn on and off. In FIG. 3, the "higher" levels of abstraction are represented toward the top of the figure, while lower levels are represented toward the bottom.

At a level below OS Kernel 301 is the system hardware, i.e., the physical processors, memory, buses, and other components which cause instructions to be executed. The hardware is generally the collection of physical devices (as opposed to data stored in devices) described above and shown in FIGS. 1 and 2, including other hardware not shown in FIGS. 1 and 2.

Immediately above hardware is low-level operating system 301, also referred to as the operating system kernel (OS kernel). In a physical sense, the OS kernel is code, i.e., it is data in the form of instructions which is stored in various memory locations and executed on one or more processors to perform the required function. The OS kernel provides certain base operating system function needed to share system resources, allocate memory, enforce security, and so forth. Among the functions provided by OS kernel 301 are paging function 302 and dispatching function 303. Pager 302 is called when an executing thread attempts to access data which is not currently in the system's distributed main memory, i.e., the data is not in any of the local memories 104 in the various nodes. In this case, pager 302 causes the required data to be fetched from storage (such as a rotating magnetic disk drive storage device), and placed in one of the local memories 104. Dispatcher 303 dispatches threads waiting to be executed to processors for execution, as explained in greater detail herein. Dispatch queue structure 304 contains active threads for dispatch by dispatcher 304. Although dispatch queue structure 304 is shown as a single entity, it is often implemented as multiple queues associated with different NUMA nodes, different thread states, and/or other parameters.

Above the level of OS Kernel 301 is a high-level portion of the operating system (high-level OS) 311. High level OS 311 may include any of various utilities and functions, some of which may be restricted for use by system administrators or similar privileged users, while others are for use of general applications users to access certain capabilities which users should not access directly, and still others are available to provide commonly-used functional capability so that each user does not have to duplicate the functions himself. For example, high-level OS 311 may provide the ability to define authorized users, passwords, access control lists or similar data structures regulating system security (which are typically restricted in access), or may provide various utility functions for a database 321, such as database definition functions, query functions, and the like (which are typically available to all or a wide class of users). In the preferred embodiment, high-level OS includes at least one software monitoring program 312 for simultaneously monitoring the execution of multiple software threads on system 100, the operation of which is explained in greater detail herein.

Also above the level of OS Kernel 301 are various user applications 313-316, database 321 containing user accessible data, and user files 322-325. User applications 313-316 may include any of various conventional applications performed by a computer system, such as personnel records, accounting, code development and compilation, mail, calendaring, word processing, or any of thousands of user applications, now known or hereafter developed. Such applications may access database 321 and/or user files 322-325 for storage, retrieval and update of information required by the application. User applications 313-316 may execute through called functions in high level OS 311, or may by-pass high-level OS 311 and directly invoke OS Kernel 301.

Various software entities are represented in FIG. 3 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 3, it will be understood that the actual number of such entities may vary and in particular, that in a complex computer system environment, the number and complexity of such entities is typically much larger. Furthermore, it will be understood that various entities could be stored in a distributed fashion on multiple computer systems.

In the preferred embodiment, computer system 100 utilizes an IBM i/Series™ operating system. However, virtually any multi-tasking operating system could alternatively be utilized, such as any of various UNIX™-based operating systems, various Microsoft Windows™ operating systems, and so forth, including operating systems hereafter developed.

Operation

In accordance with the preferred embodiment of the present invention, a monitoring thread, being an executing instance of monitoring program 312, collects data relating to the execution of multiple threads being executed by computer system 100 ("monitored threads"), the monitored threads executing on or associated with different nodes. The monitoring thread executes on different nodes, preferably by sequentially causing itself to be dispatched to different nodes in a round robin manner. When executing in any particular node, the monitoring thread collects data relating to a subset of the monitored threads which is associated with that particular node. In the preferred embodiment, "associated" means that the monitored thread is currently executing in, or most recently executed in, the particular node, although the association may alternatively be by other means (e.g., a defined association of threads to nodes, as a preferred execution locus). In one implementation of the preferred embodiment, the monitoring thread traverses a list of monitored threads and collects data with respect to those threads associated with the current node; in a second implementation, the monitoring thread pre-sorts a list of monitored threads into subsets associated with nodes. The operation of the monitoring thread is described in greater detail below with respect to the example of FIG. 4 and flow diagram FIGS. 5A-5B.

Figure 4:
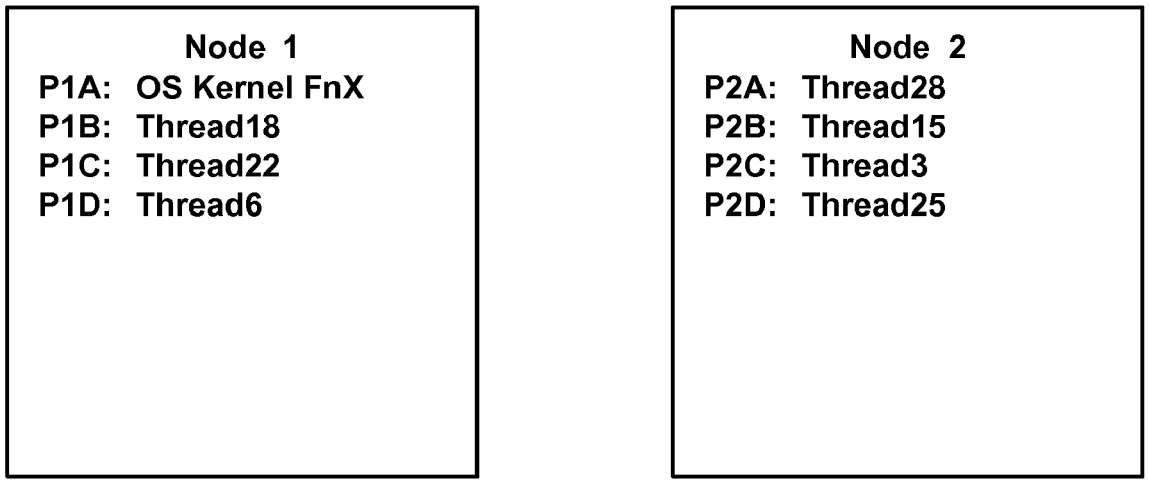
FIG. 4 is a conceptual illustration of an exemplary execution state of computer system 100 at an instant in time, according to the preferred embodiment.
Figure 4:
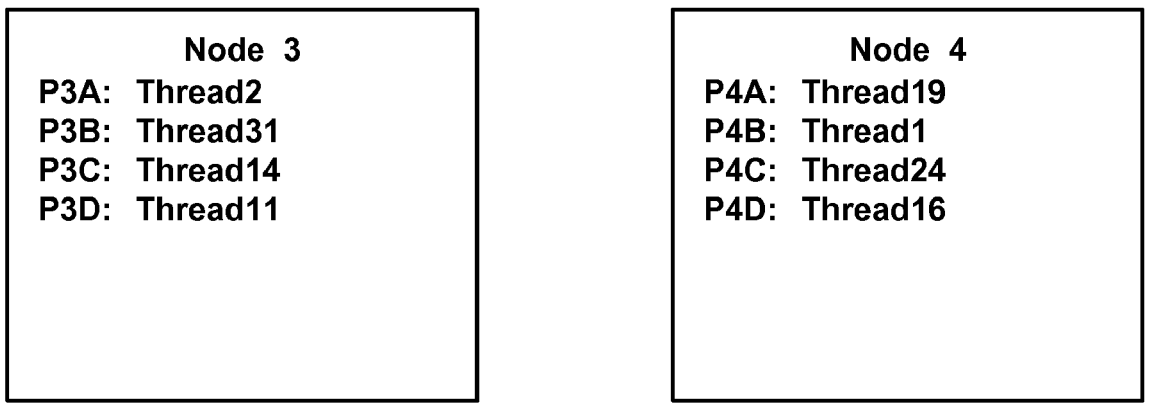
Figure 4:
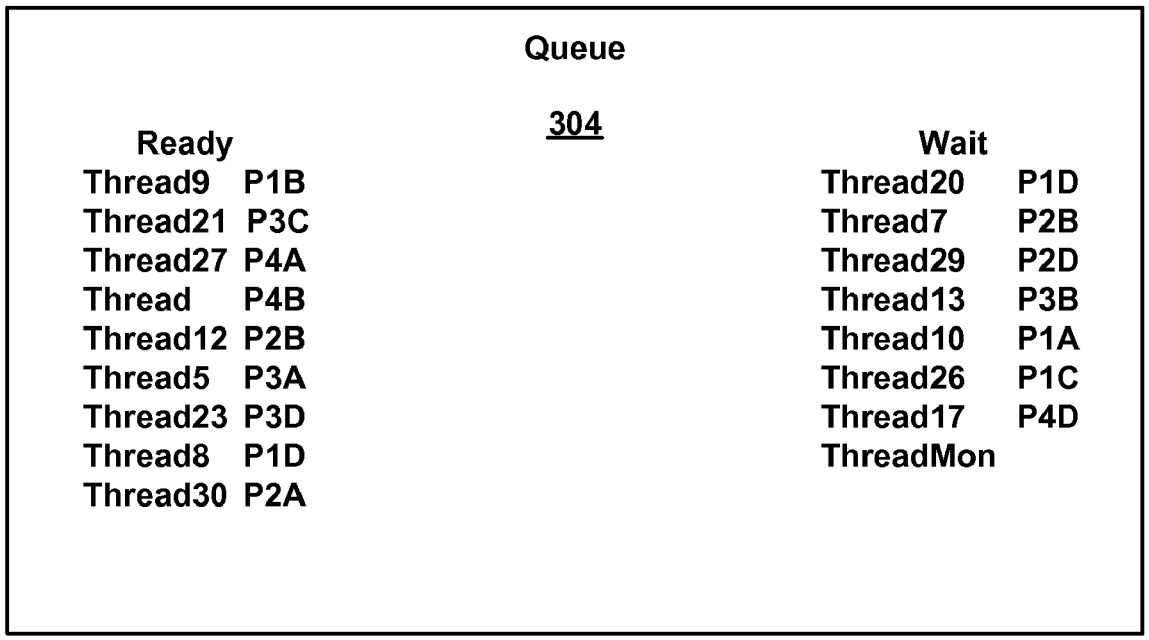

FIG. 4 is a conceptual illustration of an exemplary execution state of computer system 100 at an instant in time. In the example of FIG. 4, it is assumed that system 100 contains four nodes, each node containing four processors and a local portion of main memory. In this example, the processors for node 1 are designated P1A-P1D, for node 2 are designated P2A-P2D, and so on. At any given moment, each processor is typically executing a user thread, i.e., an instantiation of a user application program 313-316 or high-level OS function called on behalf of a user. A processor may in some cases be idle or executing some OK Kernel function; in some architectures, OS Kernel functions will be confined to specific nodes of the system. In the example of FIG. 4, processor P1A is executing an OS Kernel function, while the other processor are executing user threads. E.g., processor P1B is executing Thread18, processor P1C is executing Thread22, and so on.

In addition to the threads which are actually executing on a designated processor, there are a substantial number of active threads which are not executing at the current instant of time illustrated in FIG. 4. Depending on the system architecture, these active but not executing threads could be in any of various states, but in general the states of the non-executing active threads may be divided into two categories, these being a category of ready states and a category of wait states. Threads in a ready state are ready to execute immediately as soon as an available processor becomes available. Threads in a wait state are not ready to execute, but are waiting for some other event to occur. A typical such event (although by no means the only such event) would be the completion of a paging operation to page in needed data from storage; in this case, the thread is not ready to execute until the paging operation completes. Many operating systems divide the dispatch queue 314 into multiple portions, including at least one ready queue of threads in a ready state, and at least one wait queue of threads in a wait state, as illustrated in FIG. 4; however, such a division is not required in accordance with the present invention.

It will be understood that any representation of the state of the active threads, such as shown in FIG. 4, is only transient. Execution of threads in processors is being continually halted (either due to need for a resource, time-out of allotted processor time, or other condition), and other threads are dispatched by dispatcher 313 for execution.

A node (or a processor, which implies the node in which the processor is located) is associated with each thread in queue 304. One purpose of "association" of threads to nodes is to increase the likelihood that the thread will execute consistently in the same node. In the preferred embodiment, pager 302 preferentially loads each new page from storage to local memory in the node which is "associated" with the thread causing the page fault. Generally, this thread will be swapped out and placed in a wait state pending resolution of the page fault. When the needed page is in memory, the thread will then be placed in a ready state, and eventually dispatched to a processor. In the preferred embodiment, dispatcher 303 preferentially dispatches the thread to its associated node. By using such concepts of "association", the data required by a particular thread will tend to accumulate consistently in the local memory of a particular node, i.e. the "associated" node, and the thread will tend to execute in that node, thus reducing the proportion of inter-node memory accesses.

The means used for creating an "association" of threads to nodes, and the algorithms used by pager 302 and dispatcher 303 in furtherance of the "association", may vary, and in general any known technique, or any technique hereafter developed, may be used. Threads might be associated with nodes by providing separate queue structures for each node, each thread being in a respective one of the queue structures. Alternatively, there may be a shared queue structure for all nodes, in which the control blocks or similar data representing threads contain fields specifying the association. An association may be a parameter of the program which is assigned by a compiler or other means above the level of the OS Kernel, but in the general case of a thread executing a user application, it is expected that the OS Kernel will make the association based on load balancing and other considerations. An "association" may be absolute, in the sense that the pager must load a new page to the associated node, and/or the dispatcher must dispatch the thread only to the associated node, or may be a preference which can in certain circumstances be overridden if resources in the associated node are overly constrained.

In the preferred embodiment, the OS Kernel associates each newly instantiated thread (not already having an association) to a respective one of the nodes. This could be done on a round-robin or random basis, but could involve more complex considerations. For example, where a program spawns multiple threads, the OS Kernel may attempt to associate the new thread with the same node as that with which any existing threads of the same program are associated, on the assumption that these threads might use common data. If there are no existing threads of the same program, the OS Kernel may associate the thread to a node based on workload balancing considerations, e.g., to the node which has the smallest number of threads associated with it, or by some other measure is a least busy node. Once the association is made, the dispatcher will preferentially dispatch the thread to a processor in the associated node, and the pager will page in any data required by the thread to the local memory of the associated node. In a simple embodiment, the association of a thread to a node, once made, remains fixed for the life of the thread. In an alternative embodiment, the association may be changed in certain circumstances to re-balance system workload. If the dispatcher can override the association and dispatch the thread to another node, the association of thread to node may change whenever the dispatcher dispatches a thread to a different node (so that the association always reflects the most recent node on which the thread executed), or it may remain the same even though the dispatcher dispatches the thread to another node (so that the thread will tend to return to its original node).

In the preferred embodiment, at least some threads, and in particular the monitoring thread, have the capability to designate their association to the dispatcher. In the case of the monitoring thread, this designated association is an absolute preference which must be followed by the dispatcher, i.e., the dispatcher must dispatch the monitoring thread to a processor in the designated associated node and no other. This designation is a dynamic parameter of the thread, which can be altered by the thread during execution.

Figure 5A:
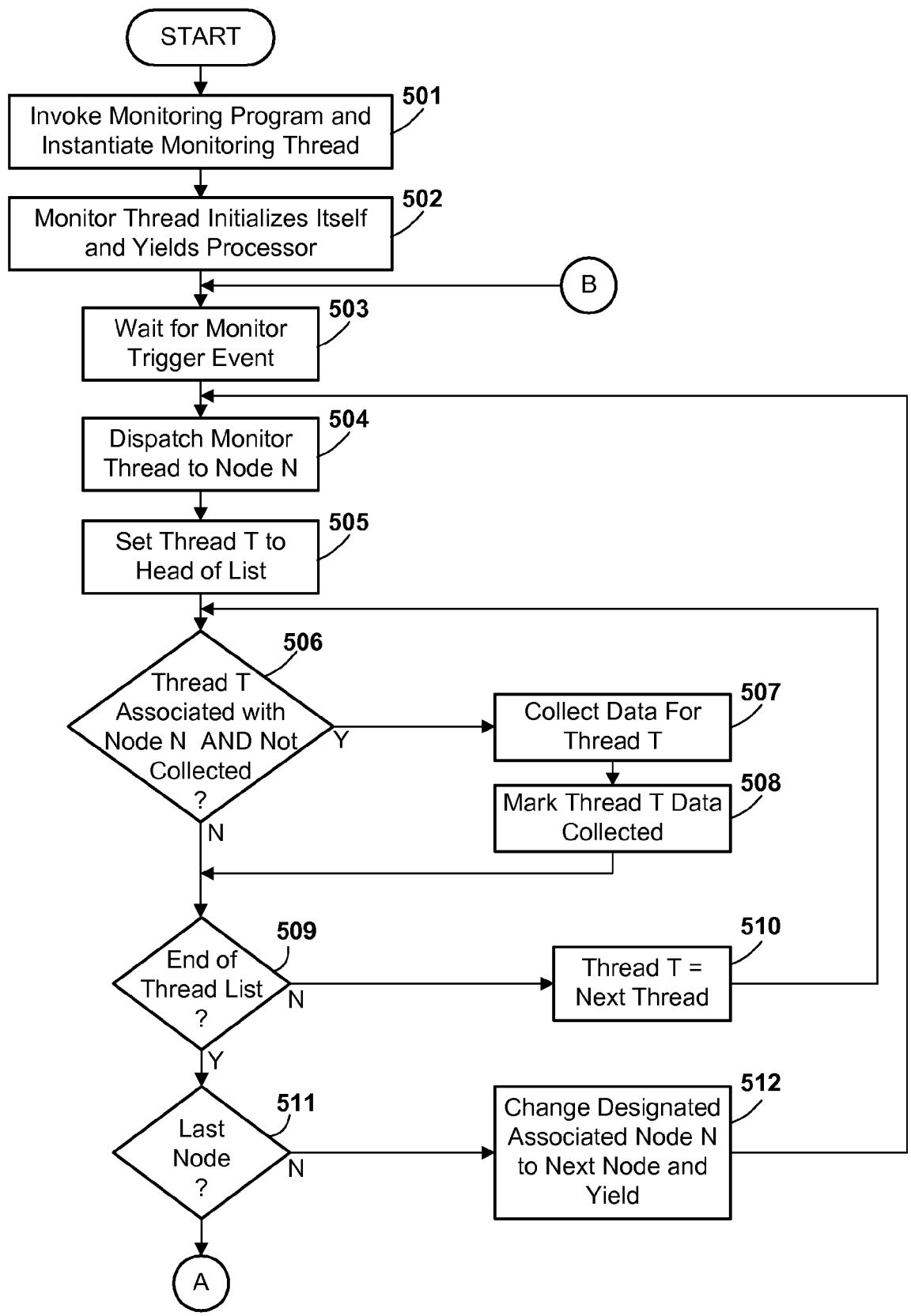
FIGS. 5A and 5B (herein collectively referred to as FIG. 5) are a high-level flow diagram showing the process of monitoring multiple threads executing on different nodes of a NUMA computer system, according to the preferred embodiment.
Figure 5B:
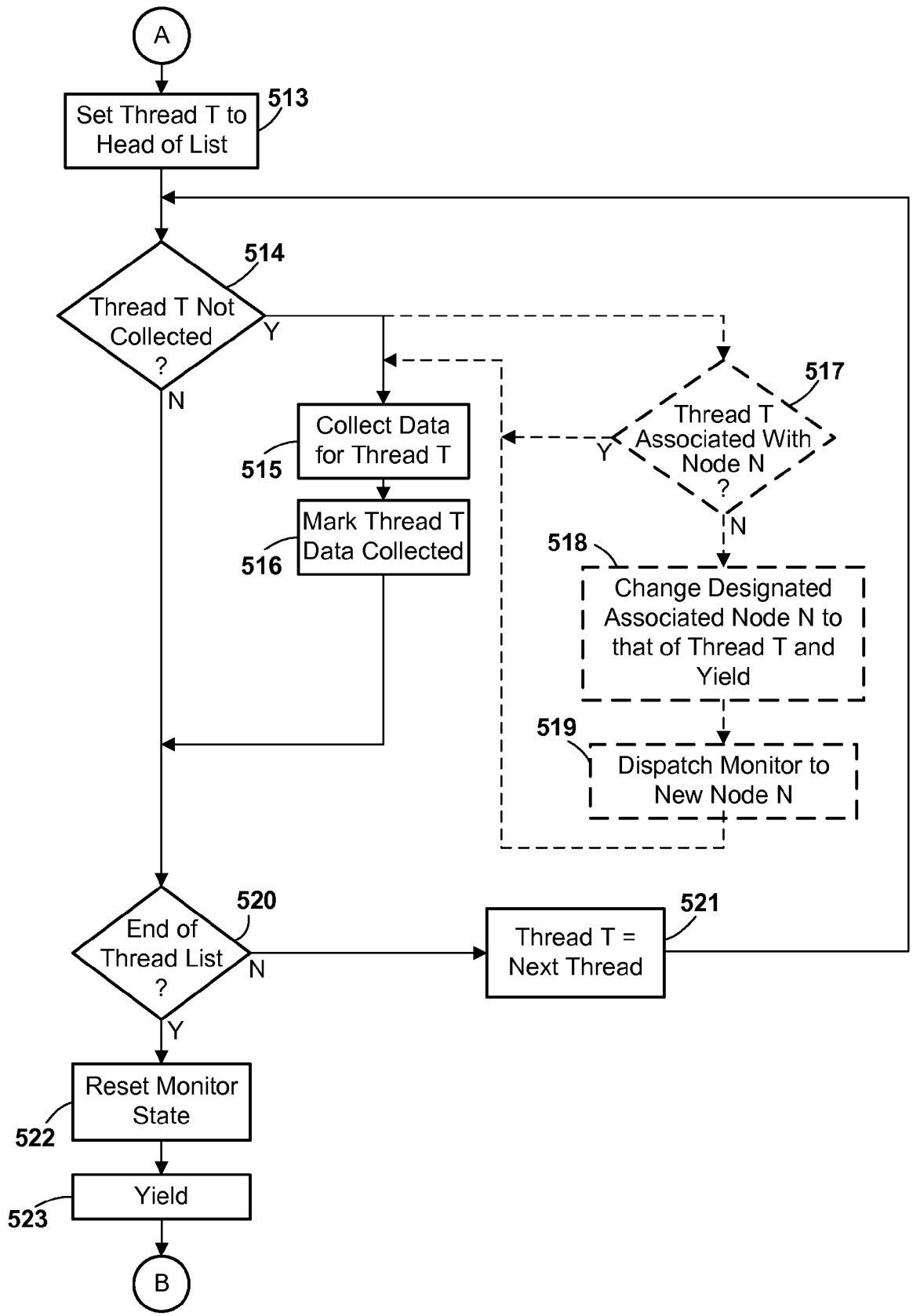

FIGS. 5A and 5B (herein collectively referred to as FIG. 5) are a high-level flow diagram showing the process of monitoring multiple threads executing on different nodes of computer system 100, according to the preferred embodiment. Referring to FIG. 5, monitoring program 312 is invoked, and a monitoring thread is instantiated as an active thread for execution (step 501). As for any other active thread, OS Kernel creates appropriate control blocks or other data structures to represent the active thread in the OS Kernel, and particularly for use by dispatcher 303. Dispatcher 312 causes the monitoring thread to be dispatched for execution to one of the processors, and the monitoring thread then initializes its internal state, including in particular initializing a list of nodes to be traversed when collecting data and a list of monitored threads for which data is to be collected (step 502). The monitored threads could be all active threads in the system, or might be some subset of active threads determined according to user specified criteria.

In the typical case, monitoring thread collects data upon the occurrence of some external triggering event, and in particular will usually collect data multiple times on the occurrence of multiple respective external events. An external event might be the expiration of a timer, so that the monitoring thread is awakened at periodic intervals to collect data, or might be some other event relating to the system state. As represented in FIG. 5, after initialization the monitoring thread waits for the occurrence of the external event (step 503). Waiting means that the monitoring thread yields the processor so that it is no longer executing, causing dispatcher to place the monitoring thread on the dispatch queue in a wait state. Before yielding, the monitoring thread designates its initial nodal association, this being an absolute association, so that the next time it is dispatched, it will be dispatched to a processor in the node with which it is associated. The monitoring thread remains in a wait state in the dispatch queue until a triggering event occurs to cause it to begin collection of data.

Upon the occurrence of the triggering event, the monitoring thread's state is changed to 'ready', causing dispatcher to dispatch it to a processor in the designated associated node (Node N) (step 504). If no processor is available in that node, the monitoring thread waits on the dispatch queue, in a ready state, until a processor is available in the designated associated node. Typically, it is expected that the monitoring thread will have a relatively high dispatch priority, one which is higher than most user application threads. Therefore the monitoring thread will be assured of reasonably prompt dispatch to an available processor as it traverses the various nodes. Prompt dispatch of the monitor will in some circumstances improve the quality of the collected data. For example, where a monitor collects data at periodic intervals of a clock, it is desirable to finish each data collection in the shortest possible period, so that the interval between data collections is nearly identical for each thread.

The monitoring thread maintains of list of threads to be monitored (for which data is to be collected), which includes status information such as whether data has yet been collected from each corresponding thread. When the monitoring thread is dispatched to a new node, it initializes the current thread T (for which data is to be collected) to the head of the monitored thread list (step 505).

If the current thread T is associated with node N, and if data has not yet been collected for thread T in the current data collection interval, the 'Y' branch is taken from step 506. In this case, the monitoring thread collects the data for thread T (step 507), and marks thread T in the monitored thread list to indicate that data has been collected for thread T in the current data collection interval (step 508). Because step 506 assures that thread T is associated with the node in which the monitoring thread is executing, it is expected that most of the data collected will reside in the local memory of this node (Node N), and hence most of the memory accesses required by the monitoring thread will be to local memory. If the current thread T is not associated with node N, or if its data has already been collected, then steps 507 and 508 are skipped.

If the monitoring thread has not yet reached the end of the list of monitoring threads, the 'N' branch is taken from step 509, the monitoring thread selects the next thread on the list of monitored threads as the current thread T (step 510), and repeats steps 506-509. When the monitoring thread has reached the end of the list of monitored threads, the 'Y' branch is taken from step 509 to step 511.

If the monitoring thread has not yet traversed all nodes in system 100, the 'N' branch is taken from step 511. The monitoring thread then changes its designated associated node (Node N) to that of the next node to be traversed, and causes itself to yield the processor (step 512). The yield caused at step 512 is equivalent to a temporary suspension of execution by the dispatcher due to timeout or other cause, and has the effect of immediately placing the monitoring thread on the dispatch queue in a ready state. Because the monitoring thread is preferably at a relatively high priority, the dispatcher will typically respond by dispatching it to the next node N rather quickly (step 504). Steps 505-511 are then repeated. When the monitoring thread has thus traversed all nodes in system 100, the 'Y' branch is taken from step 511.

In the general case, there may be one or more threads which have changed their nodal association during the time interval in which the monitoring thread was traversing nodes and collecting data, and in this case it is possible that, although the monitoring thread has traversed all nodes, it has skipped at least one thread. For example, suppose a triggering event occurs when the execution state is that shown in FIG. 4. Thread 22 is then forced to yield processor P1C, and the monitoring thread ("Thread Mon") is dispatched to Node 1. The monitoring thread then collects data for threads 6, 8, 9, 10, 18, 20, 22, and 26 (i.e., the threads associated with Node 1). The monitoring thread then changes its association to node 2, yields the processor in node 1, and is re-dispatched to node 2. In node 2, the monitoring thread collects data for threads 3, 7, 12, 15, 25, 28, 29 and 30, then yields the processor and is re-dispatched to node 3. Let us suppose that, in the time interval since the monitor was in node 1, thread 21 has been dispatched to node 1 and its association has been changed to node 1. The monitor thread will now skip thread 21, because it is associated with a different node. In order to deal with this potential skipping of a thread, the monitoring thread performs one last pass of the monitored thread list to collect data for any skipped threads, as represented by steps 513-518. If it is known in advance, from architectural considerations or otherwise, that there will be no skipped threads (e.g., thread associations are fixed and never change), then steps 513-518 may be omitted.

The monitoring thread therefore initializes the current thread T (for which data is to be collected) to the head of the monitored thread list (step 513). If data has not yet been collected for thread T in the current data collection interval, the 'Y' branch is taken from step 514, and the monitoring thread will collect data for thread T. If data has already been collected, steps 515-519 are skipped.

Because the monitoring thread has recently collected data for all threads associated with node N, it is likely that thread T is associated with a node other than node N. If the monitoring thread collects the data for thread T while executing in node N, most of the data accesses required are likely to cross node boundaries (unless the required data is already in node N's remote cache 105. Two alternative courses of action exist. In a first alternative the monitoring thread can simply go ahead and collect the data, crossing the node boundary as necessary to access data (step 515). The monitoring thread then marks thread T in the monitored thread list to indicate that data has been collected for thread T in the current data collection interval (step 516). In a second alternative, the monitoring thread first checks the nodal association of thread T (step 517), and if thread T is associated with a node other than node N, the monitoring thread changes its own nodal association to that of thread T and yields the processor (step 518), causing the dispatcher to re-dispatch the monitoring thread to the node of thread T (step 519). The monitoring thread then proceeds as in steps 516-517, but in this case most of the data collected can be expected to reside in the node of the monitoring thread. Steps 517-519 are in dashed lines to represent that this implementation is optional. The choice between the first alternative or second alternative above will depend on the expected relative costs of collecting data across a node boundary and changing the executing node of the monitoring thread.

If the monitoring thread has not yet reached the end of the list of monitoring threads, the 'N' branch is taken from step 520, the monitoring thread selects the next thread on the list of monitored threads as the current thread T (step 521), and repeats steps 514-520. When the monitoring thread has reached the end of the list of monitored threads, the 'Y' branch is taken from step 520 to step 522.

Generally, the monitoring thread collects data at multiple data collection intervals. In this case, having collected all required data for the current data collection interval, the monitoring thread resets itself as required for the next data collection interval (step 522). The monitoring thread then yields the processor (step 523) and returns to the wait queue to await the next data collection triggering event. It would alternatively be possible to employ a monitoring thread for one-time data collection, in which case the monitoring thread would halt execution after the 'Y' branch is taken from step 520.

In the algorithm described above as a preferred embodiment and certain variants, the monitor thread traverses the nodes in sequence, and in each node dynamically determines the current association of the threads and collects data from threads accordingly. Various alternative algorithms could be used within the scope of the present invention, of which the following are a few examples, it being understood that these alternatives are described as illustrative examples, and not by way of limitation on the scope of alternatives possible.

In one alternative, the monitoring thread or some other function pre-sorts the list of monitored threads in an order correlating to the nodal association of the threads, and the monitoring thread then collects data in the order of the list. In a simple example, all threads associated with node 1 are sorted at the beginning of the list, followed by all threads associated with node 2, and so forth. When the monitoring thread reaches a point in the list corresponding to the threads associated with another node, it changes its designated node association, yields the processor, and is dispatched by dispatcher to a processor in the next node. Such a pre-sorted list of monitored threads might be a single list, or a set of lists, each list corresponding to a respective node. It will be observed that the disadvantage of this approach is that the nodal association of some monitored threads may change between the time that the list is pre-sorted and the data is collected. However, it has the advantage of assuring a consistent order of data collection, which may be useful in some circumstances, particularly if the nodal association of monitored threads changes infrequently or not at all.

In a second alternative, the monitor simply follows the threads. I.e., the monitor traverses the list of monitored threads in an arbitrary order (or an order previously specified by some other system consideration), and if the next thread for which data is to be collected is not associated with the node in which the monitor is executing, it changes the designated associated node to that of the next thread, yields the processor, and is dispatched by the dispatcher to the next node. This alternative allows greatest possible flexibility in the order in which data for monitored threads is collected (and therefore greatest possible compatibility with any existing monitoring thread applications, in which the order may be significant). It will naturally be expected that this will cause the monitoring thread to yield and change nodes frequently, but this may be acceptable if the cost of a node switch is not large.

In the preferred embodiment, the monitoring process has been described as implemented in a single sequential thread, so that data is collected in a sequence for different monitored threads. It will be recognized that it would alternatively be possible to implement a monitoring process as a plurality of concurrently executing threads. For example, the process could be implemented as a plurality of threads, each corresponding to a separate one of the nodes in which it is confined to execute, each monitoring thread collecting data for the threads associated with the node in which it executes. Depending on the architecture or the algorithm used, it may be necessary to implement some form of semaphore or other shared signal so that the monitoring threads do not collect data from the same thread twice, and do not skip any threads.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network. Examples of signal-bearing media are illustrated in FIG. 1 as memories 103.

In the description above, the NUMA architecture of system 100 has been described as a nodal architecture, in which each node has at least one processor and a respective portion of addressable main memory. However, the general concept of a non-uniform memory architecture might extend to other designs not based on processor/memory nodes as described herein, and the present invention is not necessarily limited to systems containing "nodes". In any system which has a truly non-uniform memory access pattern, in which some processors access some parts of memory faster, the present invention may provide a performance improvement for a monitoring process. In such case, suitable algorithms could be provided by modifying those described herein to take account of access times from the different processors to the different portions of memory.

Although a specific embodiment of the invention has been disclosed along with certain alternatives, it will be recognized by those skilled in the art that additional variations in form and detail may be made within the scope of the following claims:

What is claimed is:

1. A program product for monitoring threads in a non-uniform memory access (NUMA) computer system having a plurality of processors and a plurality of portions of memory, wherein each said processor accesses each memory portion in a respective memory access time, at least some of said respective memory access times being different, the set of respective memory access times for a first processor being different from the set of respective memory access times for a second processor, the program product comprising:

a plurality of computer executable instructions recorded on tangible computer-readable media, wherein said instructions, when executed by a NUMA computer system, cause the NUMA computer system to perform the steps of:

executing at least one thread of said program product on a first plurality of said processors having different sets of respective memory access times to different memory portions of said NUMA computer system, said program product for collecting data for a plurality of monitored threads of said NUMA computer system product, each monitored thread being associated with a respective said portion of memory;

selecting a respective subset of said plurality of monitored threads corresponding to each of said first plurality of processors, said subsets being selected using the memory access time from each respective processor of said first plurality of processors to each respective memory portion with which a respective monitored thread is associated; and collecting data for each said monitored thread of each respective said subset of said plurality of monitored threads by executing a thread of said program product in a respective said processor corresponding to the respective said subset.

2. The program product for monitoring threads of claim 1, wherein said step of selecting a respective subset of said plurality of monitored threads corresponding to each of said first plurality of processors comprises:

changing an order in which data is collected for monitored threads to group monitored threads associated with the same respective portion of memory together.

3. The program product for monitoring threads of claim 1, wherein said step of selecting a respective subset of said plurality of monitored threads corresponding to each of said first plurality of processors comprises:

changing a processor on which a thread of said program product is executing to reduce memory access time to a portion of memory with which a next monitored thread for which data is to be collected is associated.

4. The program product for monitoring threads of claim 3, wherein said program product has the capability to designate an absolute association with a portion of memory;

wherein a dispatcher dispatching threads in said NUMA computer system is bound to follow said absolute association by dispatching a thread of said program product only to a processor associated with the designated portion of memory; and wherein said step of changing a processor on which said program product is executing comprises: (a) changing a designated portion of memory with which said program product has said absolute association, and (b) yielding the processor on which said thread of said program product is executing.

5. The program product for monitoring threads of claim 1, wherein said computer system comprises a plurality of nodes, each node containing a respective subset of said plurality of processors and a respective said portion of memory, wherein memory access time for each processor to access the respective said portion of memory contained in the node containing the processor is less than memory access time for the processor to access any respective portion of memory contained in a different node.

6. The program product for monitoring threads of claim 1, wherein each said monitored thread is associated with a respective said portion of memory using at least one of the set of association criteria consisting of: (a) a portion of memory associated with a processor on which the respective monitoring thread has most recently executed; (b) a designated association made by the respective thread itself; and (c) an association made by an operating system at the time the thread is instantiated based on workload balancing considerations.

7. The program product for monitoring threads of claim 1, wherein said program product process periodically collects data for said monitored threads responsive to an automatic triggering event.

8. A non-uniform memory access (NUMA) computer system, comprising:

a plurality of nodes, each node comprising at least one processor and a respective portion of main memory of said computer system, wherein a memory access time from each respective processor to a memory location in the portion of memory in the same node as the respective processor is less than a memory access time from the respective processor to a memory location in a portion of memory in a different node than the respective processor;

an operating system including at least one dispatcher, said dispatcher dispatching threads for execution on said processors;

a thread monitor which automatically collects data for a plurality of monitored threads executing on said computer system, each monitored thread being associated with a respective node of said plurality of nodes, said thread monitor being embodied as a plurality of instructions executable by at least one said processor of said computer system and storable in said main memory of said computer system, each instance of said plurality of instructions of said thread monitor forming one or more threads dispatchable by said dispatcher, wherein said thread monitor preferentially collects data for monitored threads associated with the node containing a processor in which the thread monitor is executing when collecting the data.

9. The computer system of claim 8, wherein said thread monitor changes an order in which data is collected for monitored threads to group monitored threads associated with the same node together.

10. The computer system of claim 8, wherein said thread monitor changes a processor on which said thread monitor executes to coincide with a node with which a next monitored thread for which data is to be collected is associated.

11. The computer system of claim 10, wherein said thread monitor has the capability to designate an absolute association with a node;

wherein said dispatcher is bound to follow said absolute association by dispatching a thread of said thread monitor only to a processor within the designated node; and wherein said thread monitor changes a processor on which said thread monitor executes by: (a) changing a designated node with which said thread monitor has said absolute association, and (b) yielding the processor on which said thread of said thread monitor is executing.

12. The computer system of claim 8, wherein said dispatcher is shared by all nodes of said computer system, and selects a thread for dispatch to an available processor from among a plurality of threads on one or more common dispatch queues, said one or more common dispatch queues not being restricted for dispatching of threads to any particular node of said plurality of nodes.

13. The computer system of claim 8, wherein each said monitored thread is associated with a respective said node using at least one of the set of association criteria consisting of: (a) a node containing a processor on which the respective monitoring thread has most recently executed; (b) a designated association made by the respective thread itself; and (c) an association made by said operating system at the time the thread is instantiated based on workload balancing considerations.

* * * * *